US011988348B2

United States Patent
Lee

(10) Patent No.: US 11,988,348 B2
(45) Date of Patent: May 21, 2024

(54) LAMP FOR VEHICLE AND VEHICLE INCLUDING THE SAME

(71) Applicant: HYUNDAI MOBIS CO., LTD., Seoul (KR)

(72) Inventor: Hyun Soo Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 17/659,805

(22) Filed: Apr. 19, 2022

(65) Prior Publication Data

US 2022/0412526 A1  Dec. 29, 2022

(30) Foreign Application Priority Data

Jun. 23, 2021  (KR) .................. 10-2021-0081846

(51) Int. Cl.
*F21S 41/20* (2018.01)
*F21S 41/24* (2018.01)
*F21V 8/00* (2006.01)
*G02B 6/42* (2006.01)

(52) U.S. Cl.
CPC ............ *F21S 41/24* (2018.01); *F21S 41/285* (2018.01); *G02B 6/002* (2013.01); *G02B 6/4268* (2013.01)

(58) Field of Classification Search
CPC .......... F21S 41/29; F21S 41/295; F21S 43/27; F21S 45/40; F21S 45/47; F21S 45/49; F21S 41/255; F21S 41/43; F21S 41/25; F21S 41/27; F21S 41/26; F21S 43/236; G02B 7/022; G02B 6/424; G02B 6/4242; G02B 6/4243; G02B 6/4244; G02B 7/008; G02B 7/028; G02B 6/4266; G02B 6/4267; G02B 6/4268; G02B 6/4269; G02B 19/00; G02B 6/0001; G02B 17/08; F21V 29/50; F21V 29/70; F21V 5/02; F21V 5/04; F21V 5/043; F21V 5/048; F21K 9/61

See application file for complete search history.

(56) References Cited

U.S. PATENT DOCUMENTS

| | | | | |
|---|---|---|---|---|
| 8,761,565 | B1 * | 6/2014 | Coleman | G02B 6/0045 362/628 |
| 2008/0180967 | A1 * | 7/2008 | Totani | F21S 45/37 362/518 |
| 2015/0062919 | A1 * | 3/2015 | Teodecki | F21V 17/02 362/311.01 |
| 2017/0144589 | A1 * | 5/2017 | Jung | F21S 41/265 |

FOREIGN PATENT DOCUMENTS

| | | | | |
|---|---|---|---|---|
| JP | 2020177626 | A * | 10/2020 | ............ F21V 29/503 |
| WO | WO-2020045674 | A1 * | 3/2020 | ............ F21S 41/143 |

OTHER PUBLICATIONS

Search English translation of WO 2020045674 A1 (Year: 2020).*
Search English translation of JP-2020177626-A (Year: 2020).*

* cited by examiner

*Primary Examiner* — Omar Rojas Cadima
(74) *Attorney, Agent, or Firm* — DLA Piper LLP (US)

(57) ABSTRACT

A lamp for a vehicle includes a light source configured to emit light; a light guide provided in front of the light source and into which the light is incident; and a heat dissipation unit provided in close contact with one side of the light guide. The light guide includes a first recessed region formed on a bottom surface of the light guide and having an upward recessed shape, and the heat dissipation unit is provided in close contact with the first recessed region.

19 Claims, 4 Drawing Sheets

LAMP FOR VEHICLE AND VEHICLE INCLUDING THE SAME

CROSS-REFERENCE TO RELATED APPLICATION(S)

This application claims priority from and the benefit of Korean Patent Application No. 10-2021-0081846, filed on Jun. 23, 2021, which is hereby incorporated by reference for all purposes as if set forth herein.

TECHNICAL FIELD

Exemplary embodiments relate to a lamp for a vehicle and a vehicle including the lamp.

BACKGROUND

Various types of lamps for a vehicle are mounted to a vehicle according to functions thereof. For example, a low beam lamp, a high beam lamp, a daytime running light (DRL) lamp, and the like are mounted to the front of the vehicle. Among these lamps, the low beam lamp forms a light distribution pattern that has a cut off line shape in an upper portion thereof.

Meanwhile, there are some cases where the low beam lamp includes an inner lens that totally reflects light and emits the light forward. Here, a region having the highest luminous intensity is formed around a cut off line in a low beam light distribution pattern, and to this end, light is also intensively concentrated on a specific region in the inner lens.

However, according to the related art, in a case where light is concentrated on the specific region of the inner lens, the temperature of the specific region in the inner lens rises excessively. Accordingly, the inner lens is deformed and damaged, and the function of the low beam lamp is not fully exhibited.

SUMMARY

Exemplary embodiments of the present invention are to solve deformation and damage to an inner lens due to light, which is concentrated on a specific region of the inner lens, in a lamp for a vehicle provided with the inner lens.

A first exemplary embodiment of the present invention provides a lamp for a vehicle, the lamp including: a light source configured to emit light; a light guide which is provided in front of the light source and into which the light is incident; and a heat dissipation unit provided in close contact with one side of the light guide, wherein the light guide includes a first recessed region formed on a bottom surface of the light guide and having an upward recessed shape, and the heat dissipation unit is provided in close contact with the first recessed region.

The heat dissipation unit may include a light-impermeable material layer applied on the first recessed region and impermeable to visible rays.

The heat dissipation unit may further include a metal member provided in close contact with the light-impermeable material layer.

The light-impermeable material layer may include a heat conductive material.

The metal member may include: a lower region that faces the first recessed region with the light-impermeable material layer therebetween; and protrusion regions that protrude from both ends of the lower region in a horizontal direction.

The lamp may further include a fastening member which faces an upper surface and side surfaces of the light guide and is fastened to the protrusion regions of the metal member.

Holes may be formed in regions, which face the protrusion regions of the metal member, in the fastening member, and the protrusion regions may be inserted into the holes of the fastening member.

The fastening member may be hook-coupled to the metal member.

The fastening member may be provided in close contact with the upper surface and the side surfaces of the light guide.

The first recessed region may include: a first surface provided in a rear region, which is adjacent to the light source, in the first recessed region; and a second surface provided in front of the first surface in the first recessed region and connected to the first surface, wherein the first surface has a shape inclined upward in a forward direction, and a cross-section of the second surface in a direction perpendicular to a front-rear direction has a shape extending in a horizontal direction.

The first recessed region may further include a third surface provided in front of the second surface in the first recessed region and connected to the second surface, wherein the third surface has a shape extending vertically downward or a shape inclined downward in the forward direction.

The first recessed region may further include a cut off portion which is provided in a region where the first surface meets the second surface and has a stepped shaped.

The lower region of the metal member may have a shape corresponding to the first surface and the second surface.

A stepped section corresponding to the cut off portion may be formed in a region, which faces the second surface, in the lower region of the metal member.

When the first recessed region is cut in the horizontal direction, the first surface may have a straight line shape or a parabolic shape recessed rearward.

A rear surface portion of the light guide may have a curved shape convexly protruding toward the light source.

A front surface portion of the light guide may include: a first curved region which has a curved shape convexly protruding forward from the light guide; and a second curved region which is provided above the first curved region and has a curved shape convexly protruding forward.

The first curved region and the second curved region may have aspherical lens shapes with different radii of curvature.

In the vicinity of a region where the first curved region is in contact with the second curved region, a radius of curvature of the second curved region may be greater than a radius of curvature of the first curved region.

A second exemplary embodiment of the present invention provides a vehicle including a lamp for a vehicle, wherein the lamp includes: a light source configured to emit light; a light guide which is provided in front of the light source and into which the light is incident; and a heat dissipation unit provided in close contact with one side of the light guide, wherein the light guide includes a first recessed region formed on a bottom surface of the light guide and having an upward recessed shape, and the heat dissipation unit is provided in close contact with the first recessed region.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION

Hereinafter, a lamp for a vehicle and the vehicle according to the present disclosure will be described with reference to the drawings.

Lamp for Vehicle

Figure 1:
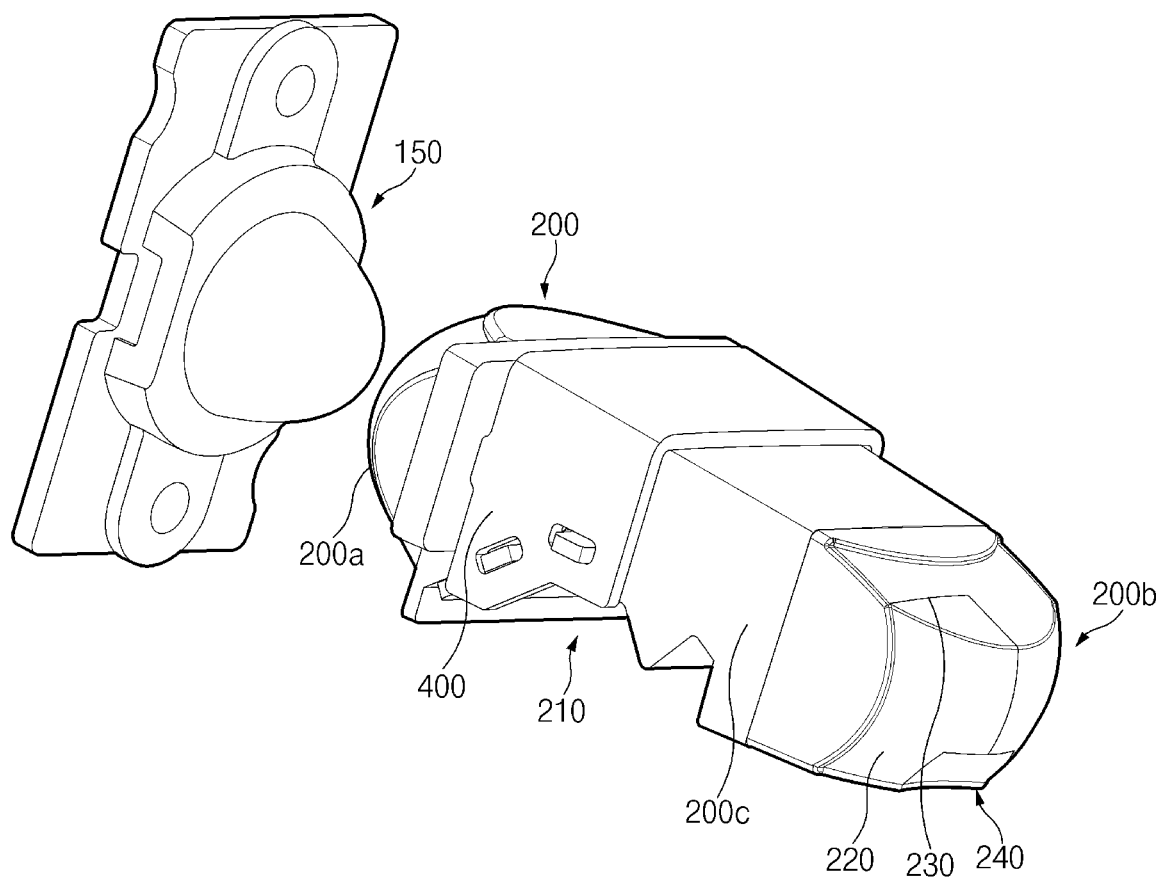
FIG. 1 is a perspective view illustrating a structure of a lamp for a vehicle according to the present disclosure.
Figure 2:
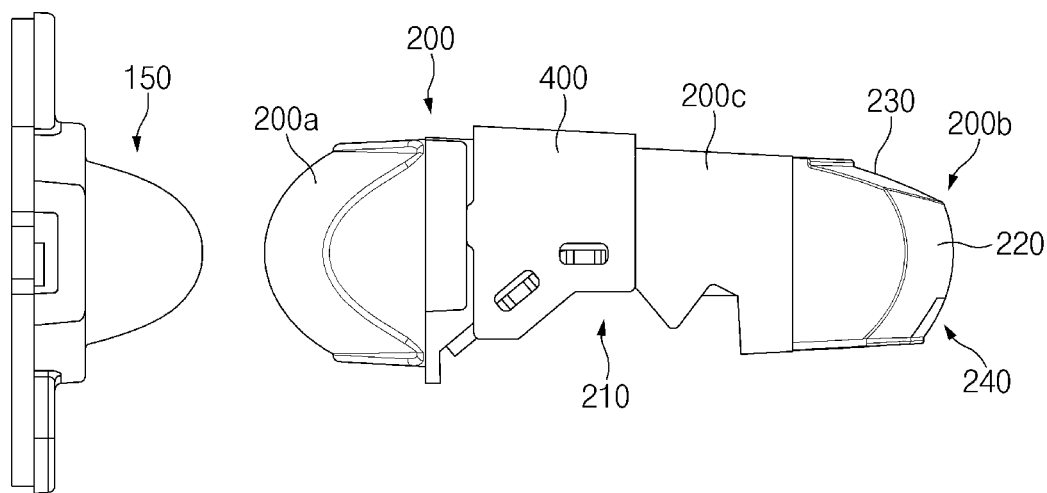
FIG. 2 is a side view illustrating the structure of the lamp for a vehicle according to the present disclosure.

FIG. 1 is a perspective view illustrating a structure of a lamp for a vehicle according to the present disclosure, and FIG. 2 is a side view illustrating the structure of the lamp for a vehicle according to the present disclosure. Also, FIG. 3 is a view in which a coupled structure of a light guide, a heat dissipation unit, and a fastening member is viewed from below in the structure of the lamp for a vehicle according to the present disclosure, and FIG. 4 is a side view illustrating a structure of the light guide of the lamp for a vehicle according to the present disclosure.

Figure 3:
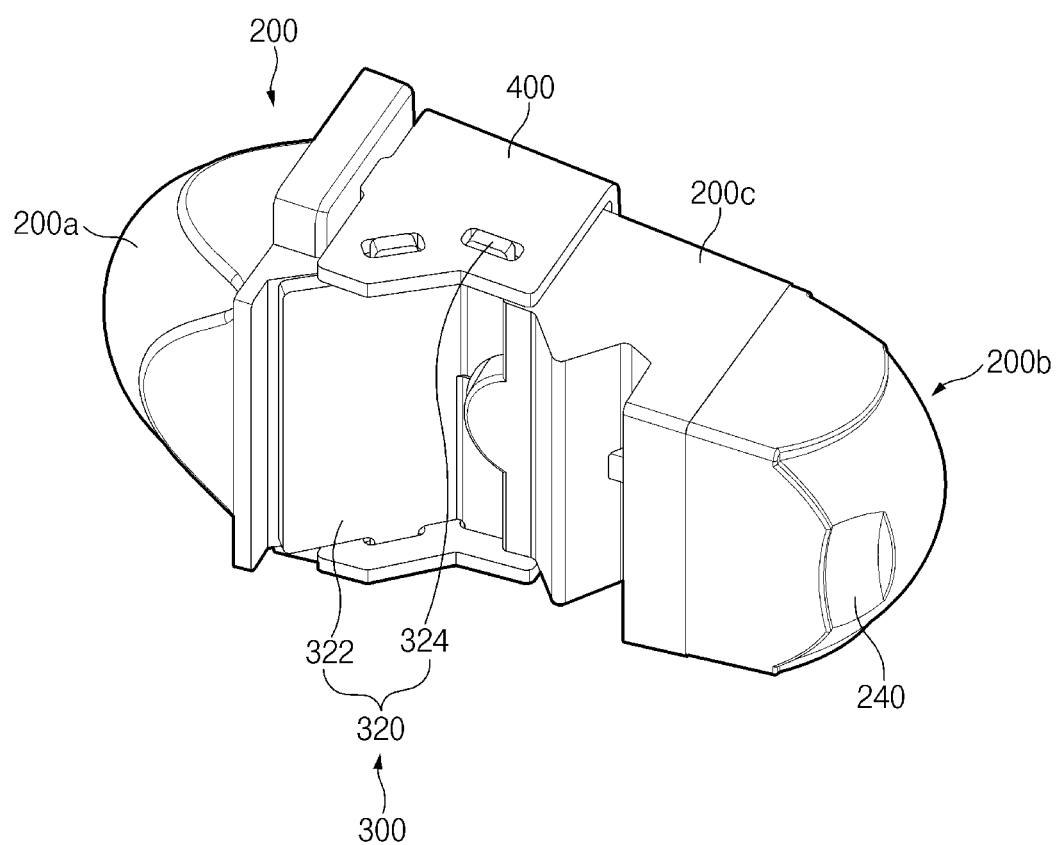
FIG. 3 is a view in which a coupled structure of a light guide, a heat dissipation unit, and a fastening member is viewed from below in the structure of the lamp for a vehicle according to the present disclosure.
Figure 4:
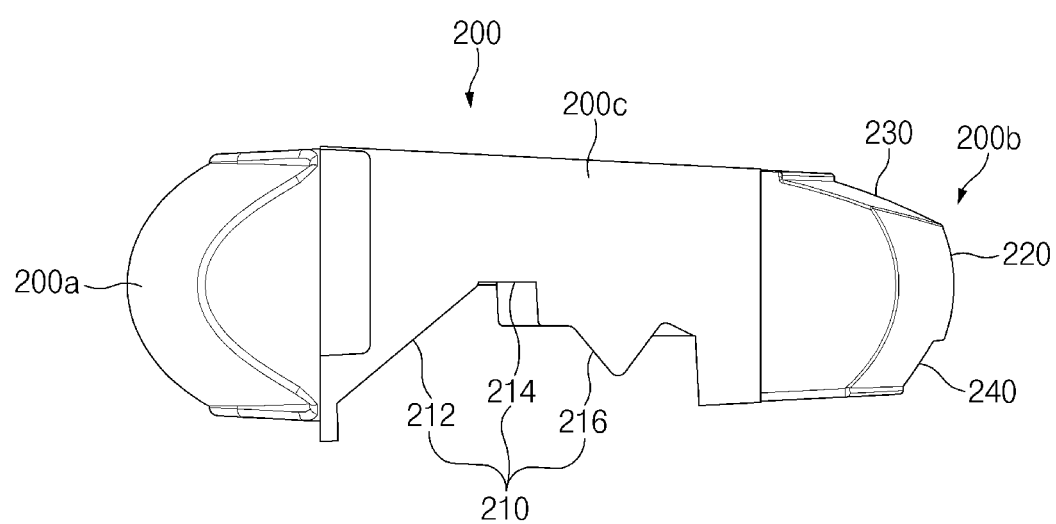
FIG. 4 is a side view illustrating a structure of the light guide of the lamp for a vehicle according to the present disclosure.

Referring to FIGS. 1 to 3, a lamp 10 for a vehicle (hereinafter, referred to as a 'lamp') according to the present disclosure may include a light source for emitting light and a light guide 200 which is provided in front of the light source and into which the light is incident. The light source may be, for example, an LED, but the type of the light source is not limited to the LED.

The light, which has been emitted from the light source and incident on the light guide 200, is moved forward inside the light guide 200 through total reflection and then may be emitted from the light guide 200.

The light guide 200 may include a rear surface portion 200a, which faces the light source and provided in a rear region of the light guide 200, and a front surface portion 200b, which is provided on the opposite side from the rear surface portion 200a and provided in a front region of the light guide 200. More specifically, the light guide 200 is provided with the rear surface portion 200a and the front surface portion 200b at both ends in the front-rear direction, and may further include a body portion 200c that connects the rear surface portion 200a to the front surface portion 200b.

Meanwhile, the light guide 200 may be a lens and made of a plastic material. The light guide 200 may be made of a glass material, but the light guide 200 may have a complicated shape unlike a typical lens, which will be described later. Thus, it is more preferable that the light guide 200 is made of a plastic material in terms of ease of manufacture of the light guide 200.

Meanwhile, the lamp 10 according to the present disclosure may be a lamp for forming a low beam light distribution pattern. To this end, according to the present disclosure, the light guide 200 may include a first recessed region 210 formed on a bottom surface of the light guide 200 and having an upward recessed shape. Thus, light, which arrives at the first recessed region 210, among the light emitted from the light source and incident on the light guide 200 is reflected from the first recessed region 210 and prevented from moving forward, and accordingly, a low beam light distribution pattern having a cut off line may be formed. More specifically, the first recessed region 210 may further include a cut off portion that has a shape corresponding to the cut off line of the low beam light distribution pattern. The cut off portion will be described later in detail.

The lamp 10 may further include a collimator 150 provided between the light source and the light guide 200. The collimator 150 may be configured to convert the light emitted from the light source into parallel light and then supply the parallel light to the light guide 200. Meanwhile, the light source described above may be surrounded by the collimator 150.

Continuing to refer to the drawings, the lamp 10 according to the present disclosure may further include a heat dissipation unit 300 provided in close contact with one side of the light guide 200. The heat dissipation unit 300 may be configured to absorb heat generated in the light guide 200 and then discharge the heat to the outside through heat conduction. More specifically, the heat dissipation unit 300 may be provided in close contact with the first recessed region 210.

As described above, the low beam light distribution pattern may be formed by the lamp according to the present disclosure, and the cut off line described above is formed in the upper region of the low beam light distribution pattern. Here, a region having the highest luminous intensity is formed around a cut off line, and to this end, a large amount of light emitted from the light source arrives at the vicinity of the cut off line. However, in this case, a large amount of light arrives at the first recessed region 210. As described above, in a case where the light guide 200 is made of a plastic material, the light guide 200 may be deformed and damaged due to the characteristics of the plastic material having relatively poor thermal resistance. Even if the light guide 200 is made of a glass material, in a case where a large amount of light arrives at the first recessed region 210, the durability of the light guide 200 may be deteriorated.

Thus, the heat dissipation unit 300 may be configured to suppress a rise in temperature of the first recessed region 210 due to the light that intensively arrives at the first recessed region 210 of the light guide 200. That is, the heat dissipation unit 300 is provided in close contact with the first recessed region 210, and the heat of the first recessed region 210 may be transferred to the heat dissipation unit 300 due to heat conduction. As a result, the rise in temperature of the first recessed region 210 may be suppressed.

More specifically, the heat dissipation unit 300 may include a light-impermeable material layer applied on the first recessed region 210 and impermeable to visible rays. As described above, since the light emitted from the light source is incident on the light guide 200, the light guide 200 is made of a material having light transmissive characteristics with respect to the visible rays. However, in order for the lamp according to the present disclosure to form the low beam light distribution pattern, the light, which is emitted from the light source and arrives at the first recessed region 210, needs to be blocked. Thus, the light-impermeable material layer may be configured to block the light arriving at the first recessed region 210 and form the cut off line of the low beam light distribution pattern.

Meanwhile, the heat dissipation unit 300 may further include a metal member 320 provided in close contact with the light-impermeable material layer. In one example, the light-impermeable material layer may include an adhesive material, and the metal member 320 may be bonded to the light-impermeable material layer by an adhesive force of the light-impermeable material layer.

The light-impermeable material layer may include a heat conductive layer. In this case, the heat generated in the first recessed region 210 may be transferred to the metal member 320 via the light-impermeable material layer due to heat conduction.

Meanwhile, according to another example of the present disclosure, the heat dissipation unit 300 may not include a metal member unlike that described above. In this case, the heat dissipation unit 300 may include only the light-impermeable material layer, and the heat generated in the first recessed region 210 may be discharged to the outside via the light-impermeable material layer having heat conductive characteristics.

Meanwhile, the metal member 320 may include: a lower region 322 that faces the first recessed region 210 with the light-impermeable material layer therebetween; and protrusion regions 324 that protrude from both ends of the lower region 322 in the horizontal direction. The protrusion regions 324 may be configured to be coupled to a fastening member 400 which will be described later. A plurality of protrusion regions 324 may be provided. In one example, as illustrated in the drawing, two protrusion regions 324 may be provided on each of the left and right ends of the lower region 322. However, the number of the protrusion regions 324 is not limited to the configuration illustrated in the drawing.

Continuing to refer to the drawings, the lamp 10 according to the present disclosure may further include a fastening member 400 which faces the upper surface and side surfaces of the light guide 200 and is fastened to the protrusion regions 324 of the metal member 320. In one example, the fastening member 400 may be hook-coupled to the metal member 320. More specifically, holes may be formed in regions, which face the protrusion regions 324 of the metal member 320, in the fastening member 400. As the protrusion regions 324 may be inserted into the holes formed in the fastening member 400, the fastening member 400 may be coupled to the metal member 320.

The fastening member 400 may be provided in close contact with the upper surface and the side surfaces of the light guide 200. This can be understood as that the fastening member 400 has an approximately vertically reversed U-shape when the fastening member 400 is cut in a direction perpendicular to the front-rear direction.

Meanwhile, referring to FIG. 4, the first recessed region 210 may include: a first surface 212 provided in a rear region, which is adjacent to the light source, in the first recessed region 210; a second surface 214 provided in front of the first surface 212 in the first recessed region 210 and connected to the first surface 212; and a third surface 216 provided in front of the second surface 214 in the first recessed region 210 and connected to the second surface 214.

Here, as illustrated in FIG. 4, the first surface 212 may have a shape inclined upward in the forward direction, and a cross-section of the second surface 214 in a direction perpendicular to the front-rear direction may have a shape extending in the horizontal direction. This can be understood as that the second surface 214 has a shape extending parallel to the ground in the front-rear direction. Also, the third surface 216 may have a shape extending vertically downward or a shape inclined downward in the forward direction. Meanwhile, the protrusion regions 324 described above may protrude from a region facing the first surface 212 and a region facing the second surface 214, respectively, in the lower region 322 of the metal member 320.

Also, the first recessed region 210 may further include a cut off portion which is provided in a region where the first surface 212 meets the second surface 214 and has a stepped shaped. The cut off portion may have a stepped shape along the left-right direction so that the cut off line is formed in the low beam light distribution pattern formed by the lamp according to the present disclosure. The cut off portion described above may be formed not only in the region where the first surface 212 meets the second surface 214 but also in the second surface 214. Thus, the stepped shape corresponding to the cut off portion may be formed on the upper edge of the cross-section of the second surface 214 in a direction perpendicular to the left-right direction.

Meanwhile, as illustrated in FIGS. 3 and 4, the lower region 322 of the metal member 320 faces the first surface 212 and the second surface 214, but may not be provided in a region facing the third surface 216. More specifically, the lower region 322 of the metal member 320 may have a shape corresponding to the first surface 212 and the second surface 214. This may be because the light emitted from the light source mainly arrives at the first surface 212 and the second surface 214, which are positioned in the rear of the first recessed region 210, but hardly arrives at the third surface 216 positioned in the front thereof.

Meanwhile, according to the present disclosure, a stepped section corresponding to the cut off portion is formed in a region, which faces the second surface 214, in the lower region 322 of the metal member 320. In a case where the stepped section is formed even in the lower region 322 of the metal member 320, the lower region 322 may be provided in close contact with the second surface 214, and thus the heat may be more effectively transferred from the second surface 214 to the lower region 322.

Continuing to refer to the drawings, when the first recessed region 210 of the light guide 200 in the lamp 10 according to the present disclosure is cut in the horizontal direction, the first surface 212 may have a straight line shape or a parabolic shape recessed rearward.

Also, the rear surface portion 200a of the light guide 200 may have a curved shape convexly protruding toward the light source. This may be to collect the light that arrives at the light guide 200 via the light source and the collimator 150, thereby providing the light to the inner space of the light guide 200.

Meanwhile, the front surface portion 200b of the light guide 200 may include: a first curved region 220 which has a curved shape convexly protruding forward from the light guide 200; and a second curved region 230 which is provided above the first curved region 220 and has a curved shape convexly protruding forward. Here, the first curved region 220 and the second curved region 230 may have aspherical lens shapes with different radii of curvature. More preferably, in the vicinity of a region where the first curved region 220 is in contact with the second curved region 230, a radius of curvature of the second curved region 230 may be greater than a radius of curvature of the first curved region 220.

Meanwhile, the front surface portion 200b of the light guide 200 in the lamp 10 according to the present disclosure may further include a second recessed region 240 which is provided below the first curved region 220 and has an upward recessed shape. That is, according to the present disclosure, an empty space may be formed in a lower region of the front surface portion 200b of the light guide 200 by the second recessed region 240.

The second recessed region 240 may be configured to secure the luminous intensity required in the regulations so that a driver can recognize at least the presence of an object even in an upper region of a low beam light distribution pattern when the light source is turned on to form the low beam light distribution pattern. That is, according to the present disclosure, at least a portion of the light, which is emitted from the light source and arrives at the second recessed region 240, may arrive at an upper region of the low beam light distribution pattern. Meanwhile, the second recessed region 240 may be below the cut off portion.

Vehicle

A vehicle according to the present disclosure may include a lamp 10 for a vehicle. The lamp 10 may be a lamp for forming a low beam light distribution pattern.

The lamp 10 may include: a light source for emitting light; a light guide 200 which is provided in front of the light source and into which the light is incident; and a heat dissipation unit 300 provided in close contact with one side of the light guide 200. Here, the light guide 200 may include a first recessed region 210 formed on a bottom surface of the light guide 200 and having an upward recessed shape, and the heat dissipation unit 300 may be provided in close contact with the first recessed region 210. Meanwhile, the contents described above with respect to the lamp according to the present disclosure may also be applied, in the same manner, to the vehicle according to the present disclosure.

According to the present disclosure, the deformation and damage to the inner lens due to the light, which is concentrated on a specific region of the inner lens, may be solved in the lamp for a vehicle provided with the inner lens.

Although the present disclosure has been described with specific exemplary embodiments and drawings, the present disclosure is not limited thereto, and it is obvious that various changes and modifications may be made by a person skilled in the art to which the present disclosure pertains within the technical idea of the present disclosure and equivalent scope of the appended claims.

What is claimed is:

1. A lamp for a vehicle, the lamp comprising:
   a light source configured to emit light;
   a light guide in front of the light source and into which the light is incident; and
   a heat dissipation unit in contact with one side of the light guide,
   wherein the light guide comprises a light blocking region having a first side internal to the light guide preventing some of the light incident on the light guide from moving forward, and having a second side opposite the first side, the second side being external to the light guide, and
   wherein the heat dissipation unit is bonded directly to the second side of the light blocking region with an adhesive, the heat dissipation unit comprises a light-impermeable material layer applied on the light blocking region and being impermeable to visible rays.

2. The lamp of claim 1, wherein the heat dissipation unit further comprises a metal member in contact with the light-impermeable material layer.

3. The lamp of claim 2, wherein the metal member comprises:
   a lower region that faces the light blocking region with the light-impermeable material layer therebetween; and
   protrusion regions that protrude from both ends of the lower region in a horizontal direction.

4. The lamp of claim 3, further comprising a fastening member that faces an upper surface and side surfaces of the light guide and is fastened to the protrusion regions of the metal member.

5. The lamp of claim 4, wherein holes are formed in regions, facing the protrusion regions of the metal member, in the fastening member, and
   the protrusion regions are inserted into the holes of the fastening member.

6. The lamp of claim 5, wherein the fastening member is hook-coupled to the metal member.

7. The lamp of claim 5, wherein the fastening member is in contact with the upper surface and the side surfaces of the light guide.

8. The lamp of claim 3, wherein the light blocking region comprises:
   a first surface provided in a rear region, adjacent to the light source, in the light blocking region; and
   a second surface provided in front of the first surface in the light blocking region and connected to the first surface,
   wherein the first surface has a shape inclined upward in a forward direction, and
   a cross-section of the second surface in a direction perpendicular to a front-rear direction has a shape extending in a horizontal direction.

9. The lamp of claim 8, wherein the light blocking region further comprises a third surface provided in front of the second surface in the light blocking region and connected to the second surface, and
   wherein the third surface has a shape extending vertically downward or a shape inclined downward in the forward direction.

10. The lamp of claim 8, wherein the light blocking region further comprises a cut off portion provided in a region where the first surface meets the second surface and has a stepped shaped.

11. The lamp of claim 10, wherein the lower region of the metal member has a shape corresponding to the first surface and the second surface.

12. The lamp of claim 11, wherein a stepped section corresponding to the cut off portion is formed in a region, facing the second surface, in the lower region of the metal member.

13. The lamp of claim 8, wherein when the light blocking region is cut in the horizontal direction, the first surface has a straight-line shape or a parabolic shape recessed rearward.

14. The lamp of claim 1, wherein the light-impermeable material layer comprises a heat conductive material.

15. The lamp of claim 1, wherein a rear surface portion of the light guide has a curved shape convexly protruding toward the light source.

16. The lamp of claim 15, wherein a front surface portion of the light guide comprises:
    a first curved region having a curved shape convexly protruding forward from the light guide; and
    a second curved region provided above the first curved region and having a curved shape convexly protruding forward.

17. The lamp of claim 16, wherein the first curved region and the second curved region have aspherical lens shapes with different radii of curvature.

18. The lamp of claim 16, wherein a radius of curvature of the second curved region is greater than a radius of curvature of the first curved region in a vicinity of a region where the first curved region is in contact with the second curved region.

19. The lamp of claim 1, wherein the light blocking region is formed on a bottom surface of the light guide and has an upward recessed shape.

\* \* \* \* \*